April 8, 1941.  C. G. ROBERTS  2,237,615
UNIVERSAL WORK SUPPORT
Filed Dec. 27, 1939  2 Sheets-Sheet 1
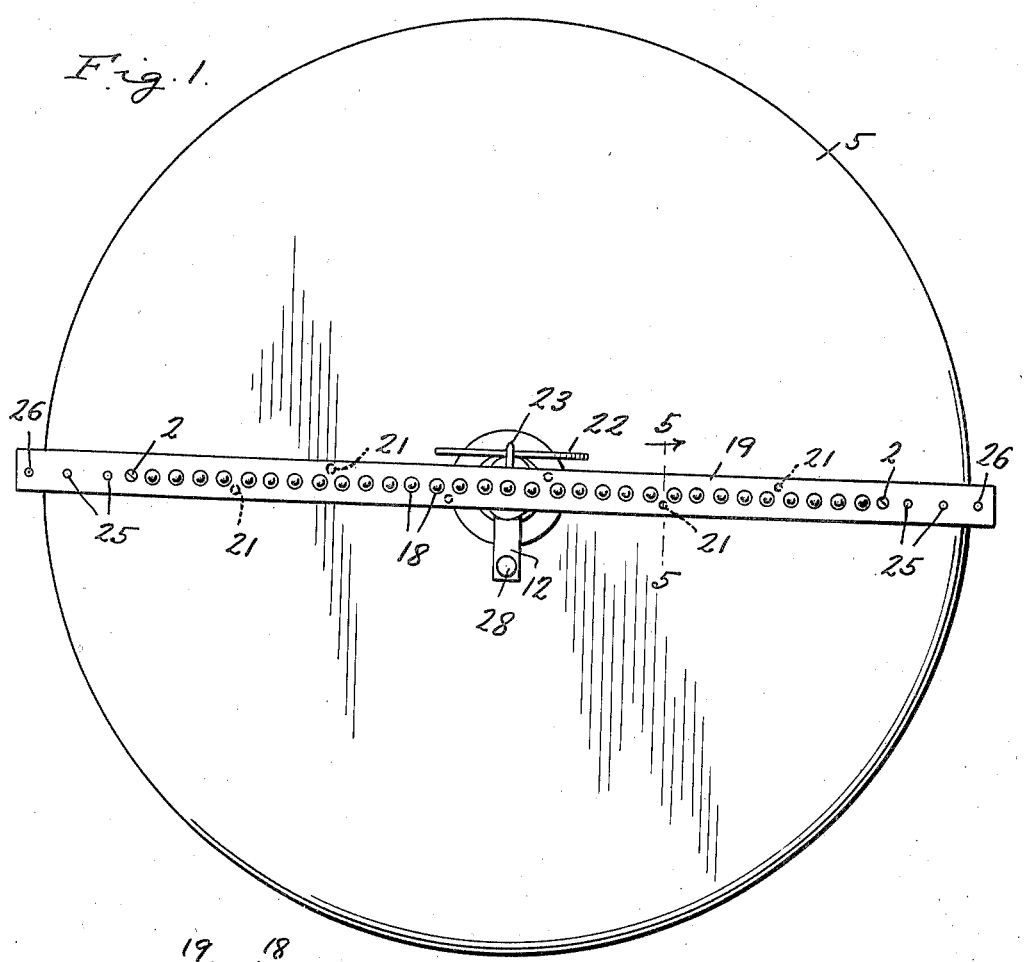
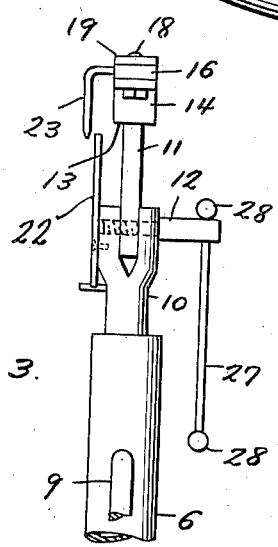
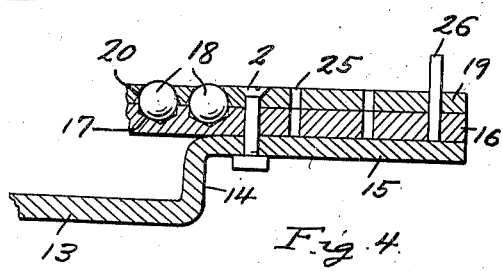
Inventor
C. Gordon Roberts
By Clarence A. O'Brien
and Hyman Berman
Attorneys April 8, 1941. C. G. ROBERTS 2,237,615
UNIVERSAL WORK SUPPORT
Filed Dec. 27, 1939 2 Sheets-Sheet 2
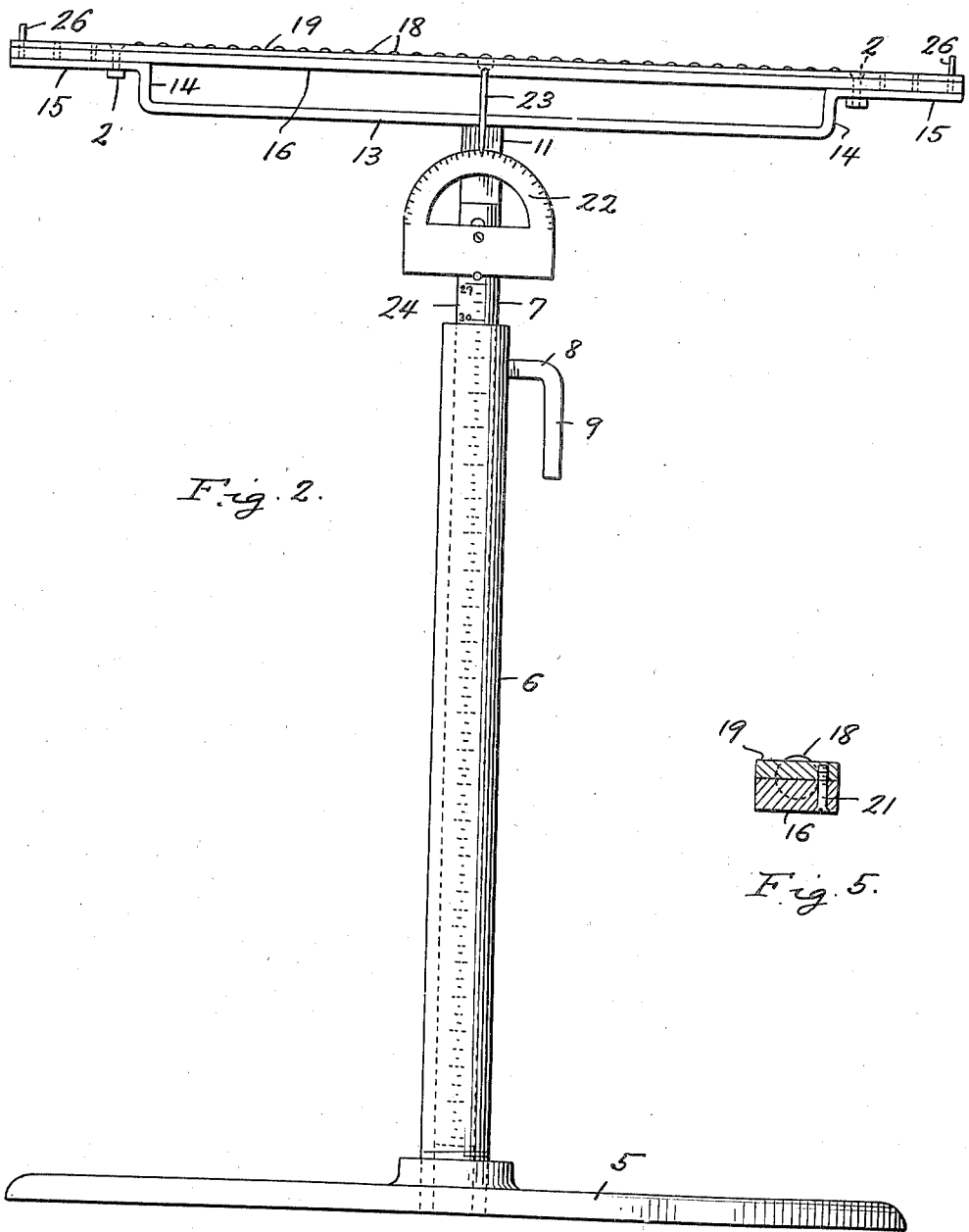
Inventor
C. Gordon Roberts
By Clarence A. O'Brien
and Hyman Berman
Attorneys Patented Apr. 8, 1941

2,237,615

UNITED STATES PATENT OFFICE 2,237,615

UNIVERSAL WORK SUPPORT

Charles Gordon Roberts, Easton, Pa.

Application December 27, 1939, Serial No. 311,223

1 Claim. (Cl. 143—132)

This invention relates to what may be termed a "Universal work support," the invention residing in the provision of a device for use in home workshops, manual training shops, small metal shops and cabinet mills for supporting work, as, for example, when such work enters or leaves a machine, or when sawing or other acts are being performed upon the work.

The invention together with its objects and advantages will be best understood from a study of the following description taken in connection with the accompanying drawings wherein:

Figure 1 is a top plan view of the support.

Figure 2 is an elevational view of the same.

Figure 3 is a fragmentary end elevational view illustrating certain features hereinafter more fully refererred to, and taken substantially at right angles to Figure 1.

Figure 4 is a fragmentary detail sectional view illustrating certain details hereinafter more fully referred to, and Figure 5 is a detail sectional view taken substantially on the line 5—5 of Figure 1.

Referring more in detail to the drawings, it will be seen that in the preferred embodiment thereof the work support comprises a suitable base member 5 from which rises a tubular standard 6.

Slidably associated with the standard 6 is a rod 7 that is secured at the desired position of vertical adjustment with respect to the standard 6 through the medium of a member 8 that has threaded engagement with an opening provided in the standard 6 adjacent the upper end of the latter to be threaded through said opening into binding contact with the rod 7. The member 8 which may be formed from a single length of metal rod is equipped with an integral handle 9, the rod being bent intermediate its ends substantially at right angles to provide the retaining pin 8 and the integral handle 9 therefor.

Provided, in any suitable manner, on the upper end of the rod 7 is a yoke 10 in the furcation of which is pivoted a shank 11.

The shank 11 pivots on a pin 12 that has a reduced threaded portion that threads into the yoke 10 at one side of the furcation thereof as shown in Figure 3 so that when the pin 12 is threaded home the pivoted end of the shank 11 will be secured within the furcation to the end that the shank 11 will be held at the desired position of angular adjustment relative to the perpendicular.

The shank 11 is secured to and depends from the intermediate portion of a frame bar 13 that adjacent its opposite ends is bent upwardly as at 14 and then longitudinally as at 15.

The frame bar 13 supports thereon a narrow elongated bearing seat-bar 16 that is provided with a longitudinal series of bearing seats or recesses 17 accommodating therein ball bearing or similar anti-friction elements 18.

Complemental to the seat-bar 16 is a bearing locking plate 19 that seats on the bar 16 and is provided with a series of openings 20 complementing the recesses 17 so as to accommodate the ball bearings 18 as shown best in Figure 5.

The bearing locking bar or cap 19 is secured to the seat-bar 16 through the medium of screws 21, which screws 21 may be arranged alternately at opposite longitudinal edges of the seat-bar 16 and cap or locking bar 19.

The assembled seat-bar 16, cap or locking bar 19, and ball bearings 18 are secured on the frame bar 13 through the medium of bolt and nut means or other suitable fastening elements 2. In this connection, and as clearly shown in Figure 2, the seat-bar 16 at its opposite ends rests on the frame bar extensions 15 and which extensions are apertured to accommodate the bolts 2 as shown.

From the foregoing it will be apparent that shank 11, frame bar 13, and associated parts may be tilted laterally to any desired angle relative to the horizontal and secured at the desired angular position of adjustment by threading home the pin 12.

For readily determining the angle at which the frame bar 13 and associated parts are disposed, there is suitably mounted on the yoke 10 a graduated scale plate 22 which is graduated in terms of degrees, and the bearing seat-bar 16 has extending downwardly from one side edge thereof intermediate the ends of said bar, a pointer or index 23 against which the graduations of the scale plate 22 are read.

Also to facilitate proper vertical adjustment of the work support the rod 7 is provided with a longitudinal scale which, preferably, is graduated in terms of inches, and the graduations of the scale, indicated generally by the reference numeral 24, may be read against the upper end of the standard 6.

Also to guard against work slipping off of the support at either end of the bearing assembly consisting of the bearing seat-bar 16, and bearing locking bar or cap 19, and associated parts, the bars 16 and 19 at the ends thereof are suitably apertured as at 25 to receive guard or stop pins 26 as best shown in Figure 4.

Also to facilitate the turning of the pin 12 for tightening up or loosening on the shank 11 said pin 12 at its outer free end is provided with a through opening that accommodates a handle 27 provided on its respective opposite ends with stop knobs 28.

In using the device the work is supported on or rests upon the exposed peripheries of the ball bearings 18 and can thus be easily shifted laterally or longitudinally as the type of performance on the work may require.

It will also be seen that by angular adjustment of the frame bar 13 the work may be held at the desired angle relative to the horizontal; and that by adjusting the rod 7 with respect to the standard 6, the work may be supported at the desired elevation.

It will be apparent to those skilled in the art that such a work support may be used for supporting work as the latter enters or leaves the machine, in the ripping of a board through the medium of a circular saw, or for the sawing of boards for cross-cuts or other desired cuts, the device being used with equal facility with a jig or band saw to cut scroll work, the ball bearings 18 being rotatable in any and all directions.

Such a device, it is believed, will be found useful in connection with the carrying of work to or from such machines as jointers, planers, or the like, and also wherever floor space is at a premium.

It is thought that a clear understanding of the construction, utility, manner of use, and advantages of an invention of this character will be had without a more detailed description.

Having thus described the invention what is claimed as new is:

In a work support, an elongated narrow frame bar, a vertically adjustable pedestal for supporting said bar, means pivotally mounting said bar on said pedestal for tilting adjustment endwise thereon, a row of antifriction balls countersunk in said bar and spaced longitudinally thereof, a work supporting bar similar to said frame bar secured to and surmounting the frame bar and in parallel relation thereto and provided with apertures through which said balls project for rolling contact with the work, sockets in said work supporting bar adjacent the ends thereof, and stop pins for insertion in said sockets to confine the work on said work supporting bar, said sockets being longitudinally spaced along the work supporting bar for selective location of the pins in accordance with the width of the work.

CHARLES GORDON ROBERTS.